Jan. 24, 1961 G. W. STANFORD ET AL 2,969,316
DESULFURIZING REFORMER FEED
Filed May 6, 1958
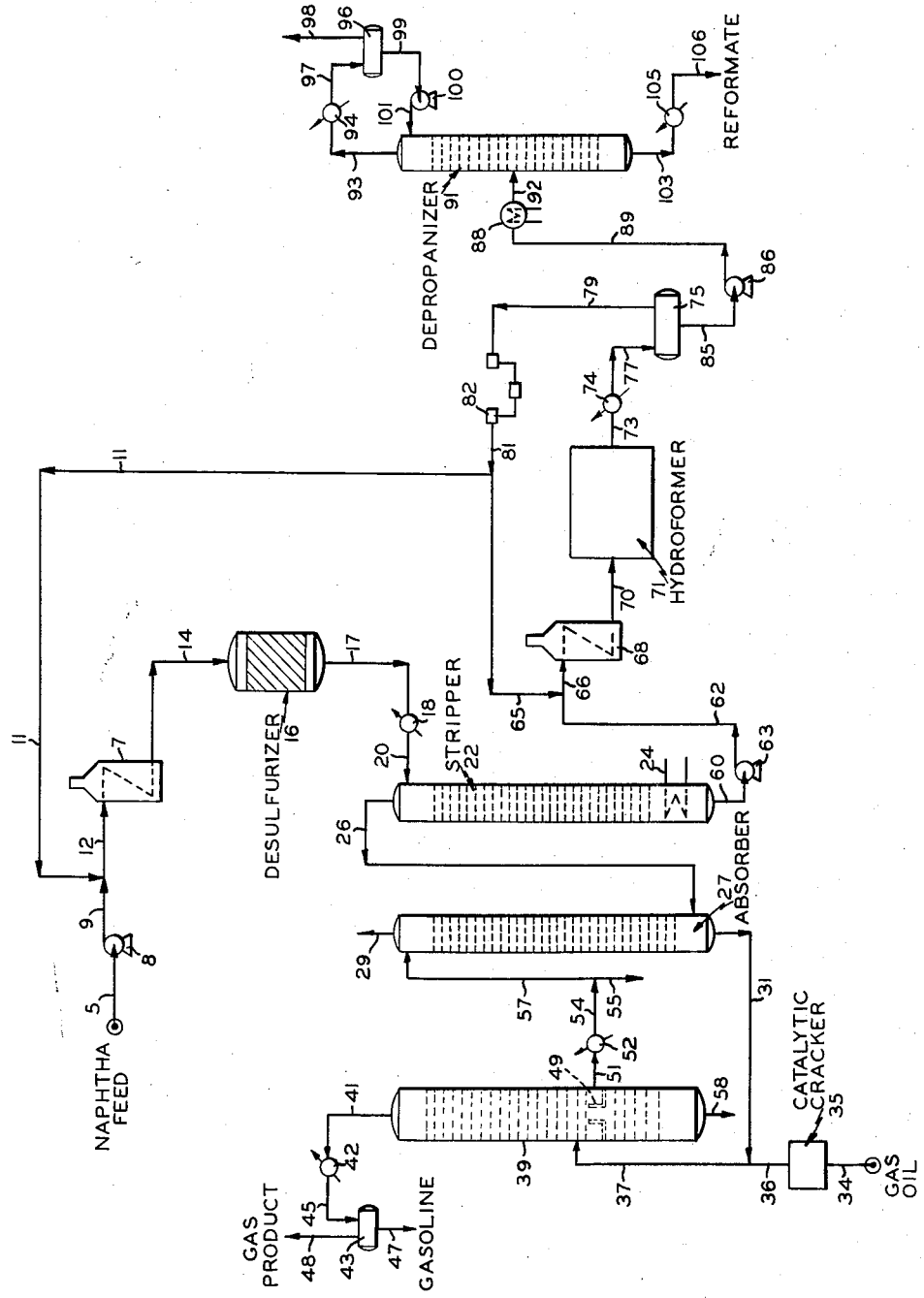
INVENTORS
GEORGE W. STANFORD
JAMES L. PATTON
BY
*D. H. Palmer*
ATTORNEY
*Carl N. Farnsworth*
AGENT

United States Patent Office 2,969,316
Patented Jan. 24, 1961

2,969,316

DESULFURIZING REFORMER FEED

George W. Stanford, Linden, and James L. Patton, Ramsey, N.J., assignors to The M. W. Kellogg Company, Jersey City, N.J., a corporation of Delaware Filed May 6, 1958, Ser. No. 733,286

5 Claims. (Cl. 208—79)

This invention relates to an improved method of reforming hydrocarbons. In one embodiment it pertains to an improved recovery system for recovering low-boiling hydrocarbons formed in the reforming process.

This is a continuation-in-part of application Serial No. 462,426, now Patent 2,834,718.

An object of this invention is to provide an improved hydroforming process.

Another object of this invention is to provide an improved method for recovering low-boiling hydrocarbons formed in the reforming process which concentrate in the hydrogen-rich recycle stream.

Other objects and advantages of this invention are apparent from the following description and explanation thereof.

In accordance with the present invention, the reforming process is operated by the method which comprises contacting a light hydrocarbon oil with a reforming catalyst under suitable reforming conditions in a reforming zone to produce a reaction product including normally liquid product and normally gaseous product containing normally gaseous hydrocarbons, gasoline components, and hydrogen, separating the liquid product from the normally gaseous product, combining a portion of the separated gaseous product with a sulfur-containing light hydrocarbon oil and subjecting the same to contact with a desulfurization catalyst under suitable desulfurization conditions to produce a desulfurized reaction product including desulfurized normally liquid material and normally gaseous product containing hydrogen sulfide, cooling the desulfurized reaction product, passing the cooled desulfurized product to a stripping zone wherein the same is hydrogen sulfide is removed substantially from the desubjected to heat and the normally gaseous product containing sulfurized liquid product and passing the stripped desulfurized liquid product to the reforming zone.

The present invention is concerned in one embodiment with a reforming process in which a light hydrocarbon oil is contacted with suitable reforming catalyst which has hydrogenation-dehydrogenation properties, or it is capable of aromatizing hydrocarbons. The reforming catalyst is one which, for the purposes of this invention, will be termed as sulfur-sensitive by reason that for the intended purpose the light hydrocarbon oil to be reformed generally contains less than about 1.5 percent by weight of sulfur. It is well known that certain reforming catalysts, such as the noble metals, are more sensitive to sulfur than, for example, molybdenum trioxide catalysts, and consequently the amount of sulfur in the feed which can be tolerated for the large variety of catalytic materials useful for this purpose will vary appreciably. In the case of the noble metals, such as platinum, palladium, etc., it is preferred that the light hydrocarbon oil contain not more than about 0.03 percent by weight of sulfur, or still more preferred, a sulfur concentration of not more than 0.01 percent by weight. In the case of the low sulfur sensitive catalysts, such as the oxides and/or sulfides of metal in groups IV, V, VI of the periodic tale, the heteropoly acids, etc., it is preferred that the feed material contain not more than about 1.5 percent by weight of sulfur, and still more preferred, not more than about 0.5 percent by weight of sulfur. The above catalytic elements are generally supported on carrier materials such as, for example, alumina, silica, silica-alumina, activated charcoal, zinc aluminate, pumice, magnesia, alumina-magnesia, etc. In general, the catalytic element comprises about 0.01 percent to about 50 percent by weight of the total catalyst. In the case of the noble metal catalysts, the catalytic element constitutes about 0.05 to about 10 percent, more usually about 0.1 to about 2 percent by weight, based on the total catalyst. Specific examples of the catalysts which can be used for this invention are platinum-alumina, molybdenum trioxide-alumina, chromia-alumina, tungsten sulfide-alumina, tungstomolybdic acid-alumina, silicotungstic acid-alumina, etc.

The feed material to be used in the present invention is a light hydrocarbon oil, e.g., naphtha. This feed material may be a straight run factor, a cracked stock, or a mixture of the two. In general, this feed material will have an initial boiling point of about 90 to about 300° F. and an end point of about 325° F. to about 475° F. The sulfur concentration of the feed material is usually more than about 0.03 percent by weight or higher than 1.5 percent by weight, and it may be as high as about 2.5 percent or 3.0 percent by weight. Depending on the source of the material, the octane number thereof may vary from about 10 CFFR to about 75 CFFR clear; whereas the olefin concentration varies from about 0 to about 30 mol percent. In the case of the catalysts which are highly sensitive to sulfur, it is desirable that the feed material have an initial boiling point in the range of about 150 to about 300° F. and an end point lying within the range of about 325° to about 400° F. It is found that feed materials containing higher end points tend to deactivate the highly sensitive catalysts such as platinum catalyst at a greater rate than is desired. As previously indicated, these catalysts are also influenced adversely by sulfur, and it is preferred that the sulfur content of feed material be not greater than about 0.03 percent by weight.

The hydroforming reaction is conducted at a temperature of from about 750° to about 1075° F., more usually from about 850° to 975° F. The reaction is carried out at a total pressure of from about 25 to about 1000 p.s.i.g., more usually from about 50 to about 750 p.s.i.g. The quantity of oil which is processed relative to the catalyst present in the reaction zone is measured as the weight space velocity, that is, the pounds of oil charged to the reaction zone per hour per pound of catalyst which is present therein. Generally, the weight space velocity is from about 0.05 to about 20, more usually, from about 0.25 to about 10. The hydroforming reaction is generally conducted in the presence of added hydrogen under conditions selected for net production of hydrogen. Consequently, the normally gaseous product material of the reforming reactions contains an appreciable amount of hydrogen which is separated and recycled for further utilization in the process. The hydrogen containing gas or recycle gas contains about 50 to about 98 percent by volume of hydrogen. The hydrogen feed rate to the reforming process is from about 500 to about 15,000 standard cubic feet, measured at 60 F. and 760 mm. Hg, per barrel of oil feed, abbreviated as s.c.f.b. More usually, the hydrogen feed rate is about 2500 to about 11,000 s.c.f.b.

The reformer or hydroforming feed material is subjected to a preliminary desulfurization treatment in the presence of a suitable desulfurization catalyst or a catalytic material which has the property of hydrogenating sulfur compounds to hydrogen sulfide. A large variety of catalytic materials may be used for this purpose including all of those which have been discussed hereinbefore in connection with the reforming reaction. When the same type of catalyst is employed for the desulfurization reaction and the reforming reaction, the conditions of reaction are selected to provide optimum desulfurization and optimum reforming. In addition to the catalytic materials enumerated above, another important class of catalysts which can be used for the desulfurization reaction is the combination of an oxide and/or sulfide of a left hand element of group VI of the periodic table and an oxide and/or sulfide of a group VIII metal having an atomic number not greater than 28. The combination of the two catalytic elements are commonly referred to as complexes, such as, for example, cobalt molybdate, nickel molybdate, nickel tungstate, etc. Such complexes may also be supported on the carrier materials which are enumerated above in connection with the reforming reaction. The complexes generally consist of about 0.1 percent to about 15 percent of an oxide and/or sulfide of a group VIII metal having an atomic number not greater than 28 and about 0.1 to 20 percent by weight of an oxide and/or sulfide of a left hand element to group VI of the periodic table.

The desulfurization reaction is conducted at a temperature of about 600 to about 875° F., more usually about 675 to about 800° F. The pressure of the desulfurization reaction varies from about 100 to about 1500 p.s.i.g., more usually about 100 to about 750 p.s.i.g. The quantity of oil which is treated under desulfurization conditions relative to the amount of catalyst which is in contact therewith is expressed as the weight space velocity, and in general, it is from about 0.5 to about 25, more usually from about 1 to about 10. The desulfurization reaction is effected in the presence of hydrogen and usually the hydrogen is obtained from the hydrogen containing product gas of the reforming reaction. In general, this hydrogen containing gas stream has from about 50 to about 98 percent by volume of hydrogen, the remainder of the gas containing for the most part low-boiling normally gaseous hydrocarbons $C_3$ and lighter, with a minor amount of $C_4$ and heavier gasoline components. In general, sufficient hydrogen for the desulfurization reaction is supplied by the hydrogen rich normally gaseous stream which is produced in the reforming reaction. The hydrogen feed rate for the desulfurization reaction is from about 100 to about 1200, more usually, from about 300 to about 900 standard cubic feet of hydrogen, measured at 760 mm. hydrogen and 60° F., per barrel of oil feed, abbreviated as s.c.f.b.

The desulfurized product is cooled to a temperature sufficient to condense substantially all of the normally liquid product which is separated from the normally gaseous product stream under the pressure employed. Since the liquid product is in contact with hydrogen sulfide, a significant quantity of hydrogen sulfide remains dissolved in the liquid product and it becomes necessary to remove the same in order to obtain a product which is suitable for further treatment in the reforming zone. For this purpose, the total cooled desulfurized product is passed to a stripping zone under essentially the pressure of the desulfurization reaction or lower pressure. The cooled desulfurized product is generally at a temperature of from about 50 to about 250° F., more usually from about 80 to about 140° F. While the preferred method of operation is to cool the desulfurized product at a pressure substantially equivalent to the desulfurization reaction pressure, except for pressure drop in the lines, etc., however it should be understood that for the purposes of this invention it is also contemplated operating at any elevated pressure or atmospheric pressure or the cooled desulfurized product can be at a pressure of from about 0 to about 1000 p.s.i.g. It is advantageous to cool the desulfurized reaction product at the pressure employed in the desulfurization reaction since this eliminates the need for subsequent recompression of the desulfurization gaseous product stream for treatment to recover desired gaseous components by absorption, and less energy is expended in transferring the liquid product to the reforming zone. The cooled desulfurized product enters the stripping zone where the normally gaseous product containing $C_3$'s and lighter with a minor amount of $C_4$ and heavier hydrocarbons, as well as hydrogen sulfide is separated therefrom to a substantial extent. This separation can be greatly accelerated by introducing the cooled desulfurized product to a stripping zone of reduced pressure, namely, one which is operated at a pressure which is from about 25 to about 500 p.s.i.g., more usually from about 50 to about 150 p.s.i.g., lower than the pressure of the cooled desulfurized product. Therefore, it can be seen that the cooled desulfurized reaction product is substantially freed of hydrogen sulfide by passing the same to a stripping zone operated as herein discussed.

In the practice of this invention, a preliminary separation of condensed desulfurized liquid product from normally gaseous product may be effected prior to subjecting the desulfurized liquid product to stripping action by heat. In the stripping zone, the liquid product is subjected to heating conditions with or without the use of a gaseous stripping agent at a temperature of from about 250° F. to about 700° F., more usually from about 350° F. to about 550° F. As a consequence, substantially all of the dissolved hydrogen sulfide in the liquid product is stripped therefrom and passes overhead as a separate stream which may be combined with the normally gaseous product stream previously separated.

The normally gaseous product stream separated from the desulfurized liquid product stream is further treated for the recovery of desired hydrocarbon constituents, $C_3$'s and heavier from the lower boiling constituents in the gaseous stream. For this purpose, the normally gaseous product stream is contacted with a normally liquid hydrocarbon or petroleum fraction in an absorption zone at a temperature of from about 50° F. to about 150° F., more usually from about 60° F. to about 120° F., and a pressure of from about 50 to about 500 p.s.i.g. The liquid absorbent used may be any liquid material which has suitable solubility characteristics for the low-boiling hydrocarbon constituents. However, in a preferred aspect of this invention, it is preferable to use the cycle oil from a catalytic cracking operation for the purpose of absorbing the $C_3$ and heavier components from the lighter components. The cycle oil to be used as the absorbing medium for recovering the desired hydrocarbon constituents contained in the normally gaseous product of the desulfurization reactor has in general an initial boiling point of from about 350° F. to about 500° F., and an end point of from about 500° F. to about 800° F., and an API gravity of from about 15 to 40° API.

In the practice of this invention, a feed material or high-boiling hydrocarbon oil for the catalytic cracking operation, such as, for example, gas oil, reduced crude, etc., is contacted with a suitable siliceous cracking catalyst, e.g., silica-alumina under suitable cracking conditions, such as, for example, a temperature of about 875° F., to about 1100° F., a pressure of about 0 to about 20 p.s.i.g., a catalyst to oil ratio on a weight basis of about 1 to about 20, and a weight space velocity of about 0.1 to about 10. The product of the cracking operation is passed to a first separation zone wherein the gasoline and lighter product material is yielded overhead; a cycle oil for re-processing in the cracking operation and a heavy residual oil fraction, are yielded as products of the process. In accordance with this invention, a portion of the cycle oil is passed to the absorption zone discussed herein for the recovery of a major portion of the $C_3$ and heavier hydrocarbons in the gaseous hydrocarbons by absorption from the remaining portion of the hydrogen-containing gas stream and the enriched absorbent is then returned to the recovery section of the catalytic cracking process for further separation into desired constituents. By this method of operation, the cycle oil of the cracking operation is utilized as the absorption medium for the combination process of desulfurizing and reforming.

By practicing the invention according to this preferred embodiment, valuable low-boiling hydrocarbons, $C_3$'s and lighter, formed in the reforming step are removed from the process thereby preventing these hydrocarbons from building up in the hydrogen recycle stream to such an extent that they detrimentally reduce the hydrogen concentration of the recycle stream which ultimately reduces catalyst life. That is to say, during the reforming reaction, in addition to the desired liquid reformed product, hydrogen and low-boiling hydrocarbons are formed such as $C_1$ to $C_4$ hydrocarbons and particularly $C_1$ to $C_3$ hydrocarbons. These low-boiling hydrocarbons when separated from the normally liquid hydrocarbon product are concentrated in the normally gaseous product which is desirably hydrogen rich for recycle to the reforming zone. A portion of this hydrogen rich normally gaseous product stream is also recycled to the desulfurization reaction zone associated with the reforming process. It is extremely important to maintain a high hydrogen concentration in the recycle stream while controlling the concentration of $C_3$ and lighter hydrocarbons therein. This is accomplished in the preferred embodiment of the present invention by passing a portion of the normally hydrogen rich gaseous product stream to the desulfurization step to supply the hydrogen requirements thereof and convert sulfur compounds to hydrogen sulfide. The desulfurization product is then passed to a stripping zone wherein hydrogen sulfide and low-boiling hydrocarbons are separated from the desulfurized normally liquid product stream prior to passing the liquid product to the reforming step. The normally gaseous product stream containing hydrogen sulfide is then passed to a suitable absorber in contact with catalytic cracker cycle oil for recovery of valuable low-boiling hydrocarbons from the gaseous product. This preferred embodiment distinguishes over methods wherein a portion of the feed to the desulfurization step has been used as the absorbent. This latter method tends to concentrate $C_3$ and lighter hydrocarbons to a point where they are ultimately carried into the reforming zone with the desulfurized feed, thereby increasing their concentration in the hydrogen rich normally gaseous product stream which as hereinbefore discussed, has been found to be less desirable. According to the improved embodiment of this invention the $C_3$ and heavier hydrocarbons contained in the gaseous stream from the desulfurization zone are recovered from the gaseous stream in an absorption zone employing a cycle oil from the catalytic cracking step as the absorbent and thereafter the enriched cycle oil absorbent is passed to the recovery section of the catalytic cracking step. This method of operation has a two-fold improvement to the extent that not only are valuable $C_3$ and heavier hydrocarbons recovered from the gaseous stream for further use, but $C_3$ hydrocarbons are prevented from building up in the feed to the reforming step of the process. In addition, this method of operation avoids the necessity of installing additional suitable low-boiling gaseous hydrocarbon recovery equipment in the recovery section of the reforming process.

In order to provide a better understanding of our invention, reference is had to the accompanying drawing which illustrates diagrammatically a specific embodiment thereof.

Straight run naphtha having an initial boiling point of about 228° F. and an end point of about 360° F., a sulfur concentration of about 0.05 percent by weight and an API gravity of about 57.0° is passed by means of line 5 at the rate of about 3600 barrels per day to pump 8 and then through lines 9 and 12 to a furnace 7. A hydrogen containing gas having approximately 75 percent by volume of hydrogen and a molecular weight of 9.8 is supplied by line 11 to line 9 at the rate of 3934 pounds per hour. The combined stream of naphtha and hydrogen containing gas is passed to the furnace 7 by means of line 12. The sulfur containing naphtha feed admixed with hydrogen rich gas is discharged from furnace 7 by means of line 14 at a temperature of 750° F., and a pressure of 295 p.s.i.g. The total feed material is passed by line 14 to the desulfurization reactor 16 wherein it is passed in contact with a fixed bed of cobalt-molybdate-alumina catalyst constituting about 3 percent cobalt oxide, 9 percent molybdenum-trioxide and the remainder alumina, on a weight basis. The quantity of oil feed being processed relative to the amount of catalyst which is present in the reactor 16 provides a weight space velocity of about 6; the pressure in the reactor being maintained at about 290 p.s.i.g. The desulfurized product stream is discharged from the reactor 16 by means of line 17 and passed through a cooler 18 wherein the temperature is reduced to about 100° F. The cooled desulfurized product is then passed from cooler 18 by means of line 20 to the top of a stripper tower 22. The pressure at the top of the stripper is maintained at about 254 p.s.i.g. and the temperature is about 100° F. The bottom of the stripper is maintained at a temperature of about 500° F. and a pressure of about 245 p.s.i.g. by the addition of heat thereto through a suitable reboiler or heat exchange coil 24.

A normally gaseous product stream containing $C_3$ and lighter hydrocarbons and a minor amount of heavier gasoline component hydrocarbons, $C_4$ and heavier, along with hydrogen sulfide formed in the desulfurization step is stripped from the normally liquid product stream in the stripper and passed overhead by means of line 26. This gaseous stream separated from the top of the stripper is passed to the bottom of the absorber 27. Catalytically cracked cycle oil having an API gravity of about 22.8° F. is fed at the rate of 6870 barrels per day from the catalytic cracking operation to the absorber tower 27 and passed in countercurrent contact with the gaseous product stream separate from the stripper tower to absorb $C_3$ and heavier hydrocarbons from the lower boiling hydrocarbons and hydrogen in this stream.

The temperature at the top of the absorber tower is about 110° F.; whereas the temperature in the bottom of the absorber is about 105° F. and the pressure therein is 245 p.s.i.g. Gaseous material containing hydrogen sulfide is discharged from the top of the absorber tower by means of line 29; with the enriched cycle oil withdrawn from the bottom of the absorber by means of line 31. The enriched cycle oil has an API gravity of about 25.0° and is discharged from the absorber tower at a rate of 7083 barrels per day. The enrichment of the cycle oil may be compared with the loss in weight of the normally gaseous material therein, which originally has a molecular weight of 8.3 when passed to the absorber at the rate of 3234 pounds per hour and has a molecular weight of about 4.6 when discharged from the top of the absorber by means of line 29 at the rate of 1617 pounds per hour.

Gas oil feed having an API gravity of 22.8° is supplied by means of line 34 to a catalytic cracking unit shown schematically as 35. The cracking unit 35 is operated at a temperature of about 950° F., a pressure of about 8 p.s.i.g., catalyst to oil ratio of about 8 and a weight space velocity of about 0.8. The cracked product is discharged from the cracker 35 by means of line 36, and thence it is combined with the enriched cycle oil which is passed through line 31 and, as a combined stream, the materials flow in line 37 to fractionator 39. In fractionator 39, the top temperature is maintained at about 275° F., the bottom temperature is about 675° F., and a pressure of about 7 p.s.i.g. is employed. Gasoline and lower boiling hydrocarbons including those separated from the enriched cycle oil from absorber 27, are passed overhead from the fractionator 39 by means of line 41 for further recovery into desired components. The vaporous overhead product is cooled to a temperature of 110° F. by means of condenser 42, and thence it is passed to a separating drum 43 by means of line 45. The gasoline product is discharged from the bottom of separating drum 43 by means of line 47 whereas the low-boiling normally gaseous product is discharged from the top of separating drum 43 by means of line 48. A cycle oil is withdrawn from an intermediate part of the fractionator 39 by means of donut tray 49 and line 51. The cycle oil is cooled to a temperature of about 100° F. by means of condenser 52, and then it is passed to line 54. The cycle oil in line 54 is separated into two portions with the major portion recycled to the catalytic cracking unit 35, by line 55; whereas the cycle oil being used as the absorption medium in absorber 27 is passed through line 57 to the top of the absorber tower 27. Residual oil product in fractionator 39 is discharged from the bottom thereof by means of line 58.

The stripped desulfurized normally liquid product stream is discharged from the bottom of stripper 22 by means of line 60. The desulfurized liquid product stream has an API gravity of about 57.8 and it is passed by line 60 to line 62 by means of pump 63 at the rate of 3681 barrels per day. The desulfurized liquid product is combined with hydrogen rich recycle gas containing 75 percent by volume of hydrogen and which has a molecular weight of about 9.8 by means of line 65 at the rate of 15,515 pounds per hour. The combined stream of desulfurized liquid product and hydrogen rich recycle gas passes through line 66 to furnace 68 wherein the combined stream is heated to a temperature of about 920° F. in furnace 68. The thus heated reactant stream is passed by line 70 to a hydroformer shown schematically as 71. The hydroformer is operated at an average temperature of about 890° F., a pressure of about 300 p.s.i.g. and a weight space velocity of about 2. The reactant materials are passed in contact with an alumina catalyst promoted with about 0.6 percent by weight platinum. The reformed product is discharged from the hydroformer 71 by line 73, cooled by means of condenser 74 to a temperature of about 100° F. and the cooled reformed product is passed from condenser 74 to separating drum 75 by means of line 77. In the separating drum 75 maintained at a temperature of about 100° F. and a pressure of about 230 p.s.i.g. the hydrogen rich normally gaseous product stream is separated from the normally liquid product stream. The normally gaseous product material is discharged overhead from the separating drum 75 by means of line 79. The total hydrogen rich gaseous product is recompressed by means of compressor 82 and the major portion of this stream is passed by lines 81 and 65 to the reformer. A minor portion of the hydrogen rich normally gaseous product is passed through line 81 and line 11 for use in the desulfurization step herein described.

The reformed liquid product is discharged from the separating drum 75 by means of line 85 at a rate of about 3248 b.p.d. to pump 86 and heat exchanger 88 by line 89, and thence it passes from heater 88 to a depropanizer tower 91 by means of line 92. The top temperature of the depropanizer tower 91 is maintained at about 125° F., while the bottom temperature of the depropanizer is about 450° F. and a pressure of about 280 p.s.i.g. The vaporous overhead product is passed by line 93, to condenser 94 wherein the temperature is reduced to about 100° F. The cooled overhead product is passed to a separating drum 96 by means of a line 97. The pressure in the separating drum is maintained at about 265 p.s.i.g. The uncondensed gaseous product is discharged from separating drum 96 by means of line 98 at the rate of 1048 pounds per hour, and this product has a molecular weight of 36.4. The condensed liquid product in separating drum 96 is discharged from the bottom thereof by means of line 99 and a portion of the condensed liquid is recycled to the depropanizer tower as reflux by means of pump 100 and line 101 at the rate of about 1537 barrels per day. This recycle stream has a density of 4.14 pounds per gallon. The depropanized liquid product is discharged from the bottom of tower 91 by means of line 103 and then it is passed to cooler 105 wherein the temperature is reduced to about 100° F. The depropanized liquid product discharged from the cooler 105 by means of line 106 at the rate of 3096 barrels per day has an API gravity of about 50.3°.

Having thus provided a description of our invention along with specific examples thereof, it should be understood that no undue limitations or restrictions are to be imposed by reason thereof, but that the scope of the present invention is defined by the appended claims.

We claim:

1. A method for controlling the concentration of $C_3$ and higher boiling normally gaseous hydrocarbons passed to a reforming zone which comprises passing a portion of a gaseous product stream containing hydrogen obtained from a reforming zone to a desulfurization zone with a sulfur-containing naphtha feed material under conditions to convert sulfur compounds therein to hydrogen sulfide, separating a product effluent of said desulfurization zone into a desulfurized naphtha product and a gaseous product stream containing hydrogen sulfide and low-boiling hydrocarbons, passing a cycle oil recovered from the fractionating zone of a catalytic cracking process in contact with the gaseous product stream separated from said desulfurization product effluent to recover by absorption said low-boiling hydrocarbons including $C_3$ and higher boiling gaseous hydrocarbons, passing the cycle oil enriched with said $C_3$ and higher boiling gaseous hydrocarbons by absorption to the fractionation zone to separate absorbed hydrocarbons from the cycle oil and passing the desulfurized naphtha substantially free of $C_3$ hydrocarbons to said reforming zone.

2. A process which comprises contacting a hydrocarbon oil feed with hydrogen-rich recycle gas in the presence of a reforming catalyst in a reforming zone under conditions to produce a reaction product effluent including normally liquid reformed product and a gaseous product containing hydrogen and low-boiling normally gaseous hydrocarbons, separating the liquid reformed product from the gaseous product, passing a portion of the separated gaseous product of said reforming zone with a sulfur-containing hydrocarbon oil feed in contact with a desulfurization catalyst under suitable conditions to produce a desulfurized reaction product effluent including desulfurized normally liquid product and a gaseous product containing hydrogen, hydrogen sulfide, low-boiling gasoline components and normally gaseous hydrocarbons, cooling the desulfurized reaction product effluent to condense a normally liquid product containing hydrogen sulfide from a gaseous product, separating the condensed liquid product from the gaseous product, passing the desulfurized liquid product to a stripping zone wherein the liquid product is stripped of hydrogen sulfide and low-boiling gasoline components, passing the stripped desulfurized liquid product as the hydrocarbon oil feed passed to the reforming zone, passing the gaseous product separated from the condensed desulfurized liquid product with the stripped low-boiling gasoline components to an absorption zone wherein the gaseous product is passed in contact with a cycle oil obtained as hereinafter defined for the recovery of low-boiling gasoline components therefrom by absorption, catalytically cracking a high-boiling hydrocarbon oil to produce a reaction product containing normally gaseous material, gasoline, cycle oil and heavy residual oil, separating the cracked reaction product in a separation zone into a cycle oil fraction, a residual oil fraction, a gasoline fraction and a gaseous product fraction and passing the cycle oil enriched with low-boiling gasoline components from said absorption zone to said separation zone.

3. A method for recovering $C_3$ and higher boiling normally gaseous hydrocarbons from a hydrogen-rich gaseous stream obtained from the product effluent of a reforming zone to prevent build-up of said $C_3$ and higher boiling hydrocarbons in the gaseous product of said reforming process which comprises passing a portion of a hydrogen-rich gaseous stream containing low-boiling $C_3$ hydrocarbons obtained from a reforming zone with a sulfur-containing hydrocarbon feed to a desulfurization zone to convert the sulfur therein to hydrogen sulfide, separating a product effluent obtained from said desulfurization zone to obtain a gaseous stream containing low-boiling hydrocarbons including $C_3$ hydrocarbons and hydrogen sulfide from a desulfurized hydrocarbon feed, passing a cycle oil obtained from a fractionation zone of a catalytic cracking operation in contact with said gaseous stream separated from said desulfurization product effluent in an absorption zone to recover low-boiling hydrocarbons including $C_3$ hydrocarbons from said gaseous stream by absorption with said cycle oil, recycling cycle oil enriched with $C_3$ hydrocarbons from said absorption zone to said fractionation zone and passing the desulfurized hydrocarbon feed substantially free of $C_3$ hydrocarbons with hydrogen-rich recycle gas obtained from said reforming zone to said reforming zone.

4. A method for recovering $C_3$ and higher boiling normally gaseous hydrocarbons from a hydrogen containing gaseous stream recovered from the product effluent of a reforming step which comprises contacting a hydrogen-rich gaseous stream containing $C_3$ and higher boiling normally gaseous hydrocarbons obtained from the product effluent of a reforming step with a sulfur-containing hydrocarbon in a desulfurization zone under conditions to convert sulfur to hydrogen sulfide, recovering a product stream from said desulfurization zone, separating said product stream under conditions to recover a gaseous fraction containing hydrogen, hydrogen sulfide, $C_3$ and low-boiling normally gaseous hydrocarbons from a liquid fraction containing desulfurized hydrocarbon substantially free of $C_3$ hydrocarbons, contacting said gaseous fraction in an absorber with a cycle oil obtained from the fractionation zone of a catalytic cracking process to absorb $C_3$ and higher boiling hydrocarbons from the remainder of said gaseous fraction, passing enriched cycle oil from said absorption step to said fractionation zone to recover absorbed $C_3$ and higher boiling hydrocarbons from said cycle oil and passing the liquid fraction separated from the gaseous fraction of said desulfurization step to said reforming step.

5. A method for the recovery of $C_3$ and higher boiling gaseous hydrocarbons found in the product effluent of a hydrocarbon reforming process which comprises passing hydrogen-rich gaseous material containing $C_3$ and higher boiling gaseous hydrocarbons obtained from a reforming process product effluent with a sulfur-containing hydrocarbon feed material to a desulfurization zone maintained under desulfurizing conditions to convert sulfur in the hydrocarbon feed to hydrogen sulfide, recovering a product effluent from said desulfurization zone for separation under conditions to recover a gaseous stream containing hydrogen sulfide and lower boiling hydrocarbons including $C_3$ hydrocarbons from a desulfurized liquid stream substantially free of said $C_3$ hydrocarbons, passing the desulfurized liquid stream with hydrogen-rich recycle gas of said reforming step to said reforming step, contacting the recovered gaseous stream of said desulfurization step with a lean oil obtained from a product recovery zone of a catalytic cracking operation to recover by absorption said low-boiling hydrocarbons including $C_3$ hydrocarbons, recovering enriched lean oil from said absorption step and separating the absorbed low-boiling hydrocarbons from the enriched lean oil in the recovery zone of said catalytic cracking operation.

References Cited in the file of this patent

UNITED STATES PATENTS

| | | |
|---|---|---|
| 1,789,470 | Loomis | Jan. 20, 1931 |
| 2,423,238 | Hoover | July 1, 1947 |
| 2,834,718 | Stanford | May 13, 1958 |

UNITED STATES PATENT OFFICE
CERTIFICATE OF CORRECTION

Patent No. 2,969,316                  January 24, 1961

George W. Stanford et al.

It is hereby certified that error appears in the above numbered patent requiring correction and that the said Letters Patent should read as corrected below.

Column 1, line 47, strike out "hydrogen sulfide is removed substantially from the de-"; line 49, for "sulfurized" read -- hydrogen sulfide is removed substantially from the desulfurized --; column 2, line 21, for "factor" read -- fraction --; line 65, for "60 F." read -- 60° F. --; column 4, lines 14 and 15, for "p.s.i.g.", each occurrence, read -- p.s.i. --.

Signed and sealed this 24th day of October 1961.

(SEAL)
Attest:

ERNEST W. SWIDER                  DAVID L. LADD
Attesting Officer                  Commissioner of Patents